United States Patent
Drewes (10) Patent No.: US 10,253,829 B2
(45) Date of Patent: Apr. 9, 2019

(54) BRAKE UNIT

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 15/500,779

(22) PCT Filed: Jul. 31, 2015

(86) PCT No.: PCT/EP2015/067626
§ 371 (c)(1),
(2) Date: Jan. 31, 2017

(87) PCT Pub. No.: WO2016/023771
PCT Pub. Date: Feb. 18, 2016

(65) Prior Publication Data
US 2017/0211639 A1    Jul. 27, 2017

(30) Foreign Application Priority Data

Aug. 12, 2014 (DE) ......................... 10 2014 215 918

(51) Int. Cl.
*F16D 51/10* (2006.01)
*F16D 65/09* (2006.01)
(Continued)

(52) U.S. Cl.
CPC ......... *F16D 51/10* (2013.01); *F16D 65/0043* (2013.01); *F16D 65/09* (2013.01); *F16D 65/22* (2013.01); *F16D 2250/0084* (2013.01)

(58) Field of Classification Search
CPC .......... F16D 51/10; F16D 51/12; F16D 51/14; F16D 65/09; F16D 65/22
(Continued)

(56) References Cited

U.S. PATENT DOCUMENTS 1,962,939 A * 6/1934 Roberts .................... F16D 51/12
188/335
1,985,128 A    12/1934 Wenner
(Continued)

FOREIGN PATENT DOCUMENTS

CN          1604998       4/2005
DE          19906798      8/2000
(Continued)

OTHER PUBLICATIONS

European Patent Office; International Search Report, dated Nov. 12, 2015.

*Primary Examiner* — Thomas J Williams
(74) *Attorney, Agent, or Firm* — Price Heneveld LLP (57) ABSTRACT

The invention relates to a brake unit and a method for maintaining a brake unit, wherein the brake unit comprises a carrier unit and a jaw unit, wherein the carrier unit can be secured to the fixed portion of a utility vehicle chassis and has a first guiding member and a second guiding member, wherein the first guiding member and the first guiding member are spaced apart from each other, wherein the jaw unit is secured by the guiding members against displacement in a guiding direction, wherein the jaw unit is secured by a securing element which can be secured to one of the guiding members against displacement along an axial line, wherein the jaw unit can be displaced in an actuation direction.

13 Claims, 4 Drawing Sheets

(51) Int. Cl.
*F16D 65/22* (2006.01)
*F16D 65/00* (2006.01)

(58) Field of Classification Search
USPC .......................................................... 188/335
See application file for complete search history.

(56) References Cited

U.S. PATENT DOCUMENTS

| | | | | |
|---|---|---|---|---|
| 1,989,726 A | * | 2/1935 | Weaver | F16D 51/12 |
| | | | | 188/335 |
| 1,997,253 A | | 4/1935 | Fleagle | |
| 2,048,053 A | * | 7/1936 | Bennington | F16D 51/12 |
| | | | | 188/335 |
| 2,068,073 A | * | 1/1937 | Rader | F16D 51/12 |
| | | | | 188/234 |
| 2,072,755 A | * | 3/1937 | Jones | F16D 51/10 |
| | | | | 188/335 |
| 2,100,973 A | * | 11/1937 | Naylor | F16D 51/12 |
| | | | | 188/335 |
| 2,108,235 A | * | 2/1938 | Ruffino | F16D 51/14 |
| | | | | 188/152 |
| 2,184,050 A | * | 12/1939 | Miler | F16D 65/52 |
| | | | | 188/152 |
| 2,197,292 A | * | 4/1940 | Brady | F16D 51/14 |
| | | | | 188/335 |
| 2,207,421 A | * | 7/1940 | Tirabasso | F16D 51/14 |
| | | | | 188/245 |
| 2,330,004 A | * | 9/1943 | Neville | F16D 51/14 |
| | | | | 188/152 |
| 2,503,489 A | | 4/1950 | James, Jr. | |
| 2,905,278 A | | 9/1959 | Kramer | |
| 3,599,762 A | * | 8/1971 | Cox, Jr. | F16D 51/14 |
| | | | | 188/173 |

FOREIGN PATENT DOCUMENTS

| | | | | |
|---|---|---|---|---|
| DE | 19906798 A1 | * | 8/2000 | ............ F16D 51/14 |
| DE | 102009043247 | | 3/2011 | |
| DE | 102010014862 | | 10/2011 | |
| EP | 2551545 | | 1/2013 | |
| GB | 1048239 | | 11/1966 | |
| GB | 1572744 | | 8/1980 | |
| GB | 1572744 A | * | 8/1980 | ............ F16D 51/14 |

* cited by examiner

BRAKE UNIT

BACKGROUND OF THE INVENTION

The present invention relates to a brake unit, in particular for use in drum brake systems, and a method for maintaining a brake unit.

Drum brakes with brake units are generally known from the prior art. In this instance, there is provided inside a preferably hollow cylindrical brake drum a brake jaw arrangement which can be spaced apart with a force by means of an actuation unit, wherein the brake jaws are pressed against the inner side of the brake drum. In brake drums known from the prior art, however, it has been found to be disadvantageous that, in order to maintain the brake unit, the brake drum and together therewith in most cases the vehicle wheels or where applicable additionally fitted outboard motors initially have to be disassembled before the wear components of the brake unit become accessible for a fitter. It has further been found that in brake units, in which the brake jaws are pivotably suspended at the first end thereof and at the opposing end are acted on by means of an actuation unit with a force, the assembly and disassembly is complex. Furthermore, as a result of the pivot movement, the brake jaws are not in abutment with the inner side of the brake drum in a uniform manner, in particular also as a result of the effect of the self-reinforcement. There have therefore already been found brake units in which the brake jaws are not pivotably suspended, but instead are guided on the carrier unit, wherein, however, in these brake units, the maintenance, in particular the disassembly and the assembly of the brake system, is particularly complex.

An object of the present invention is to provide a brake unit which can be assembled and disassembled in a particularly simple manner and which at the same time is simple to produce and achieves a sufficiently high brake action, in particular for use in utility vehicles.

SUMMARY OF THE INVENTION

According to the invention, the brake unit comprises a carrier unit and a jaw unit, wherein the carrier unit can be secured to the fixed portion of a utility vehicle chassis and has a first guiding member and a second guiding member, wherein the first guiding member and the second guiding member are spaced apart from each other, wherein the jaw unit is secured by the guiding members against displacement in a guiding direction, wherein the jaw unit is secured by means of a securing element which can be secured to one of the guiding members against displacement along an axial line, wherein the jaw unit can be displaced in an actuation direction relative to the carrier unit. The brake unit consequently comprises preferably selected subassemblies of a drum brake of a utility vehicle, wherein in particular the carrier unit and at least a jaw unit are part of the brake unit. The carrier unit is preferably the brake carrier of a drum brake and can be or preferably is secured to the fixed portion, that is to say, the non-rotating portion of the wheel suspension of a utility vehicle chassis. In this instance, the carrier unit preferably has a flange geometry which can be indirectly or directly secured using appropriately corresponding flanges to the rigid axle of the utility vehicle or to the resilient component of a utility vehicle chassis, such as, for example, a longitudinal link. In a particularly preferred manner, the carrier unit is arranged inside a brake drum and has a first guiding member and a second guiding member. Preferably, the brake jaw is arranged between the guiding members and is secured by the guiding members against displacement in a guiding direction, that is to say, both longitudinally and counter to the direction which is predetermined by the guiding direction. The guiding members are preferably two cast or forged portions of the carrier unit which extend inside a brake drum and which preferably have two guiding faces orientated mutually parallel for guiding the jaw unit. On at least one of the guiding members in the context of the present invention, there is arranged or preferably fixed a securing element which can be brought into engagement with the jaw unit so that it secures the jaw unit against displacement along an axial line with respect to the carrier unit. The axial line is in this instance preferably a parallel line with respect to the axial direction of the wheel suspension of the utility vehicle. That is to say, the axial line is the rotation axis of the wheel of the utility vehicle chassis or a parallel line with respect to this rotation axis. In a particularly preferred manner, the axial line is orientated perpendicularly to the guiding direction in this case, wherein the axial line and guiding direction in a particularly preferred manner define a plane. In a further preferred manner, there is provided an actuation direction, in which the jaw unit can be displaced relative to the carrier unit. In this instance, the actuation direction is preferably orientated perpendicularly to the plane defined by the axial line and the guiding direction. That is to say, the jaw unit is consequently arranged on the carrier unit in such a manner that a displacement between the jaw unit and carrier unit is possible only in the direction of an actuation direction or counter to this actuation direction. In a particularly preferred manner, the jaw unit in this instance is acted on with a force in the actuation direction by means of an actuation unit, wherein the actuation unit presses the jaw unit against the brake drum and consequently initiates a braking operation, for example, for a utility vehicle. As a result of the use of a securing element for securing the jaw unit against displacement along the axial line, it is possible, by simply removing the securing element, to remove the jaw unit from the brake drum, maintain it and place it back in the brake drum and subsequently to insert the securing element again in order to secure the jaw unit to the corresponding guiding member. In this manner, the brake unit enables particularly simple maintenance, wherein the structural complexity in order to configure and produce the brake unit is comparatively small. Preferably, the jaw unit is secured alone by the securing element against displacement along the axial line relative to the carrier unit. It is thereby preferably possible simply by disassembling the securing element to remove the jaw unit from the brake. Preferably, the securing element secures the jaw unit against displacement along the axial line over the entire actuation path which the jaw unit travels in the actuation direction during operation of the brake.

Preferably, a first securing element is releasably secured to the first guiding member and/or a second securing element is releasably secured to the second guiding member. In a first preferred embodiment which provides for particularly simple disassembly and assembly of the brake unit, only one securing element is provided on one of the two guiding members. In this instance, depending on the extent of the corresponding guiding face on the guiding members along the axial line, a sliding of the jaw unit out of the carrier unit is not possible since otherwise a tilting of the jaw unit between the guiding members would take place. It is consequently possible in the context of a simple construction of the brake unit to provide the corresponding function of releasably securing the jaw unit to the carrier unit with only one securing element. In a further preferred manner, in particular when tilting is intended to be prevented, a securing element may be provided on each of the guiding members, wherein at least one of the securing elements is releasable. That is to say, the first securing element may, for example, be constructed as a threaded pin or screw, whilst the second securing element is, for example, a projection which is fixedly secured to the other guiding member in each case and which is not releasable. In this preferred embodiment, the jaw unit may be inserted in a slightly oblique position between the two guiding members and may be secured against displacement along the axial line in the correct position ultimately using the first securing element, preferably by screwing the first securing element.

In a particularly preferred embodiment, the securing element can be introduced or is introduced parallel with the guiding direction into a recess of the guiding member and can be brought or is brought into a non-positive-locking and/or positive-locking engagement with an engagement geometry. In a first preferred embodiment, the securing element may in this instance be constructed as a threaded pin, for example, as a recessable screw which can be introduced into a recess which is introduced as a threaded hole into the guiding member and can be screwed therein. The engagement geometry of the guiding member is in this instance the inner thread in the recess of the guiding member. In an alternative preferred embodiment, the securing element may also be constructed as a resilient clamp which can be introduced into a corresponding recess in the guiding member. The resilient clamp is preferably supported in a positive-locking and non-positive-locking manner on an appropriately corresponding engagement geometry, for example, a recess or projection, in the recess and is consequently retained relative to the guiding member in a position in which it secures the jaw unit against displacement along the axial line. The advantage of a resilient clamp is the very simple assembly and disassembly of the connection between the resilient clamp and guiding member. The advantage of a securing element which is constructed as a screw element is that this can generally transmit higher forces than, for example, resilient clamps and consequently secures the jaw unit against displacement relative to the carrier unit with a higher degree of reliability.

In a particularly preferred manner, the recess has a stop to which the securing element can be secured in a non-positive-locking manner and is secured against rotation about a parallel line with respect to the guiding direction. In particular in the preferred embodiment, according to which the securing element is constructed as a threaded pin or screw, it may be preferable for there to be provided a corresponding stop geometry against which the securing element can be forced. In this instance, the non-positive-locking connection between the stop and the securing element prevents the undesirable unscrewing of the securing element during operation of the brake. In a further preferred manner, in the region of the stop, other engagement means may also be provided, for example a tooth-like geometry, whose retention force can be overcome only with a specific screwing force by the user in order to bring the securing element out of engagement with the guiding member.

In a particularly preferred manner, the securing element has a securing portion which can be brought into engagement with a groove of the jaw unit in such a manner that an undercut which acts parallel with the axial line is formed between the securing element and the groove. The securing portion of the securing element is preferably the region of the securing element which can be brought into positive-locking engagement with the jaw unit. In this instance, the jaw unit preferably has a groove which extends substantially longitudinally or parallel with the actuation direction and consequently enables a displaceability of the jaw unit in the actuation direction, but prevents displacement along the axial line. That is to say, in this instance the groove extends parallel with the actuation direction, in which the force of an actuation unit acts on the jaw unit. The securing portion of the securing element is in this instance configured to engage in the groove, wherein, however, sufficient play for smooth movement of the jaw unit in the actuation direction relative to the securing element and consequently relative to the carrier unit has to be ensured. That is to say, there is between the groove and the securing portion preferably always play, which enables easy displacement of the jaw unit relatively carrier unit and consequently facilitates the braking operation and also the retraction of the brake jaw after the braking operation. In a particularly preferred manner, the positive-locking engagement between the groove and the securing portion secures the jaw unit against displacement in both directions along the axial line.

In a particularly preferred manner, the securing element is constructed as a threaded pin which can be screwed into the recess of the guiding member and which has a cylindrical securing portion. In a particularly preferred manner, the securing element is provided in this instance as a screw with an engagement portion which can be recessed in the recess of the guiding member. The engagement portion on the securing element is preferably a hexagon socket or a Torx®, wherein in particular the ease of handling during disassembly and assembly of the brake unit is ensured as a result of the good engagement between the tool and securing element. The cylindrical securing portion is provided at the end of the securing element of the securing element opposite the engagement portion and has a smaller diameter than the engagement portion. Advantageously, the portion of the engagement portion facing the securing portion moves into engagement with the stop of the recess, wherein the securing portion protruding from the guiding member can move into engagement with the groove of the jaw unit which is preferably provided. The advantage of the use of threaded pins is the particularly simple and large-scale production which leads to particularly low production complexity and production costs for the production of the brake unit. The advantage of a cylindrical construction of the securing portion is the abutment face which is always the same with different screwing-in positions of the securing element in the guiding member, and consequently guiding face of the securing portion with the groove which secures the jaw unit against displacement along the axial line.

In another preferred embodiment, the securing element forms an undercut which secures the jaw unit only in a removal direction along the axial line against displacement relative to the carrier unit, wherein the guiding member preferably has a retention member which extends substantially in the guiding direction and which forms with the jaw unit an undercut which acts counter to the removal direction. In this instance, the removal direction is preferably defined as the direction in which the jaw unit can be removed from the brake drum. That is to say, the removal direction is consequently the direction which faces away from the brake drum at the open end of the brake drum. Advantageously, the removal direction is parallel with the axial line. Preferably, in this instance, the securing element is secured or flanged to the side of the carrier unit facing the open side of the brake drum and has a securing portion which secures the jaw unit against displacement in the removal direction. At the side of the carrier unit or the guiding member of the carrier unit opposite the securing element, a second securing element may preferably also be provided. Alternatively, the guiding member has at the end thereof directed counter to the removal direction a retention member which forms an undercut which acts counter to the removal direction with the jaw unit in order to secure it against displacement counter to the removal direction. The advantage of this embodiment is that the securing elements can be secured to the carrier unit from the open side of the brake drum and consequently an even simpler disassembly and assembly of the brake unit is possible than is the case with an assembly of securing elements in the guiding members which is carried out laterally, that is to say, substantially in a radial direction with respect to the brake drum. In a particularly preferred manner, the securing element is secured to the respective guiding member by means of a screw or a pin. In a particularly preferred manner, two securing elements are provided, of which one is secured to the respective face of a guiding member facing in the removal direction.

In a preferred embodiment, the guiding member forms with the retention member and the securing element a substantially U-shaped geometry. Alternatively to the retention member, there may also be provided a second guiding member which leads to standardization in the production of the brake unit and consequently saves costs. The substantially U-shaped geometry is suitable for securing the jaw unit against displacement relative to the carrier unit both in the removal direction and counter to the removal direction and at the same time for enabling a displacement movement of the jaw unit in the actuation direction. Advantageously, in this embodiment, no complex guiding geometries, such as, for example, a groove or recesses have to be provided in the guiding members and/or in the jaw unit, whereby the production of the brake unit is simplified and costs can be saved.

In a particularly preferred manner, the carrier unit at least partially forms the housing of an actuation unit. For a particularly compact construction of the brake unit, it is preferable for the carrier unit to have a portion which forms the housing of an actuation unit which is arranged in this portion, such as, for example, an expansion wedge device of an expansion wedge drum brake. In this instance, the carrier unit preferably has a central portion on which the guiding members are provided spaced apart from each other and which has a hollow space which is suitable for receiving an expansion wedge device. Furthermore, the carrier unit preferably also has guiding portions for the piston elements of an expansion wedge device, in a particularly preferred manner the carrier unit is constructed in this instance as an integral cast component, whereby in particular the production can be simplified and the number of required processing steps to produce a carrier unit is simplified.

Preferably, the securing element engages with an overlapping length on the brake jaw, wherein in an assembled state of the brake unit the jaw unit is spaced apart from the guiding member with maximum play, wherein the ratio between the maximum play and the overlapping length is from 0.01 to 0.6, preferably from 0.05 to 0.4 and in a particularly preferred manner approximately from 0.05 to 0.2. So that the jaw unit can be displaced relative to the carrier unit in the actuation direction, it is necessary between the corresponding engagement faces of the guiding members and the corresponding engagement face of the jaw unit for there to be play so that the jaw unit does not tilt and become clamped on the carrier unit. This play is preferably sufficiently large in order, in the event of the brake jaw becoming heated, to also be able to compensate for the expansion thereof. Advantageously, the securing element engages with an overlapping length on the jaw unit, wherein the overlapping length is advantageously significantly larger than the value of the maximum play between the carrier unit and jaw unit. In this manner, it is possible to prevent during operation of the brake unit, as a result of shaking movements or high forces which act on the jaw unit, the jaw unit from sliding out of the guide thereof by means of the securing elements. In this instance, the preferred ratio of from 0.01 to 0.6 of the maximum play between the jaw unit and the guiding member and the overlapping length of the securing element with the corresponding engagement geometry of the jaw unit has been found to be advantageous since this relationship range enables a good compromise of the required reliability with respect to the jaw unit falling out of the guide thereof, on the one hand, and a saving of weight by preventing oversizing of the guiding members and the securing element, on the other hand. In the embodiments, in which the safety element preferably represents a securing member for the jaw unit only in the removal direction, the overlapping length is preferably the length along which an undercut is formed with the jaw unit. The particularly preferred ratio of from 0.05 to 0.4, in particular when the securing element engages in a groove in the jaw unit, enables this groove not to be constructed to be excessively deep, whereby material weakenings in the jaw unit can be kept as small as possible and at the same time nonetheless a high level of reliability with respect to the jaw unit falling out of the guide thereof on the carrier unit is ensured. The particularly preferred range of from 0.05 to 0.2 has been found to be advantageous in particular for use in highly-loaded utility vehicles since in these both material weakenings are intended to be prevented and the weight of the brake unit has to be kept low in order to comply with the high demands on such brake systems. Advantageously, with a smaller overlapping length, the securing element is also constructed to be shorter, whereby in particular weight is saved and also the installation and removal of the securing element is facilitated.

In a particularly preferred embodiment, the carrier unit has four guiding members, two of which in each case secure a jaw unit against displacement parallel with the guiding direction, wherein a first pair of guiding members is preferably formed in a plane-symmetrical manner with respect to a second pair of guiding members with respect to a plane defined by the guiding direction and the axial line. The plane-symmetrical construction of the carrier unit enables in particular jaw units which are constructed in an identical manner to be able to be used both at one side and at the other side of the carrier unit and consequently a standardization of the production of the jaw units to be possible. In a particularly preferred manner, there is arranged in this instance centrally between the four guiding members a region of the carrier unit which is constructed as a housing of an actuation unit.

In a particularly preferred manner, the jaw units are pretensioned by a restoring element against an actuation unit. In this instance, the actuation unit is preferably the expansion wedge unit of an expansion wedge drum brake and is arranged centrally between two opposing jaw elements. In this instance, the restoring element may preferably be constructed as a helical spring or as a resilient curved member and serves to reproduce the state of the brake unit, in which the jaw units are not in engagement with the brake drum. In this case, it is preferable for disassembly of the brake unit for initially one or the large number of restoring elements to be released between the jaw units, after which it is subsequently easier to remove the jaw units from the brake unit.

Preferably, two or a large number of securing elements are provided on a guiding member and secure the jaw unit against displacement along the axial line. The securing elements may in this instance be arranged so as to be offset with respect to each other both along the axial line and in the actuation direction. Advantageously, consequently, as a result of the securing elements, tilting prevention is provided for the jaw unit and, in the event of a failure of one of the securing elements, the jaw unit can also be fixed in its position on the carrier unit.

According to the invention, there is provided a method for maintaining a brake unit, wherein, in a first state, a jaw unit is displaceably retained inside a brake drum on a carrier unit and a securing element in an actuation direction, wherein, in a first step, the securing element is moved out of engagement with the jaw unit, wherein, in a second step, the jaw unit is displaced along an axial line and is removed from the inner side of the brake drum, wherein the carrier unit remains inside the brake drum. The advantage of the maintenance method which is provided in the context of the present invention is that the brake drum does not have to be disassembled from the brake unit in order to reach the jaw units. In a particularly preferred manner, it is readily possible in this instance for the securing element to be released with the brake drum installed, whereby the jaw unit can be readily removed from the brake drum and consequently from the brake unit without the carrier unit being displaced relative to the brake drum. In a particularly preferred manner, this maintenance operation can be carried out from inside the utility vehicle whilst the wheels and additional components can remain installed in the wheel suspension of the utility vehicle. This simplifies the maintenance operations for the operation of a brake unit enormously and thus lowers the operating costs thereof. Since the jaw units have been removed from the brake drum, it is possible in a simple manner to fit new lining elements to the jaw unit and subsequently to install them in the brake system again.

In a preferred embodiment, following the above-mentioned method steps, the jaw unit with new brake linings is inserted along the axial line into the inner side of the brake drum and is arranged between two guiding members of the carrier unit, wherein the securing element is subsequently brought into engagement with the jaw unit in order to secure it against displacement along the axial line. In a particularly preferred manner, in this instance, after the jaw unit has been introduced inside the brake drum, two securing elements are provided, each of which is brought into engagement with the jaw unit and consequently a securing of the jaw unit against displacement along or parallel with the axial line is achieved in an effective manner.

Other advantages and features of the present invention will be appreciated from the following description of selected embodiments with reference to the appended figures, in which:

BRIEF DESCRIPTION OF THE DRAWINGS

FIG. 1b is a second view of the preferred embodiment shown in FIG. 1a;

DETAILED DESCRIPTION OF THE PREFERRED EMBODIMENTS

Figure 1A:
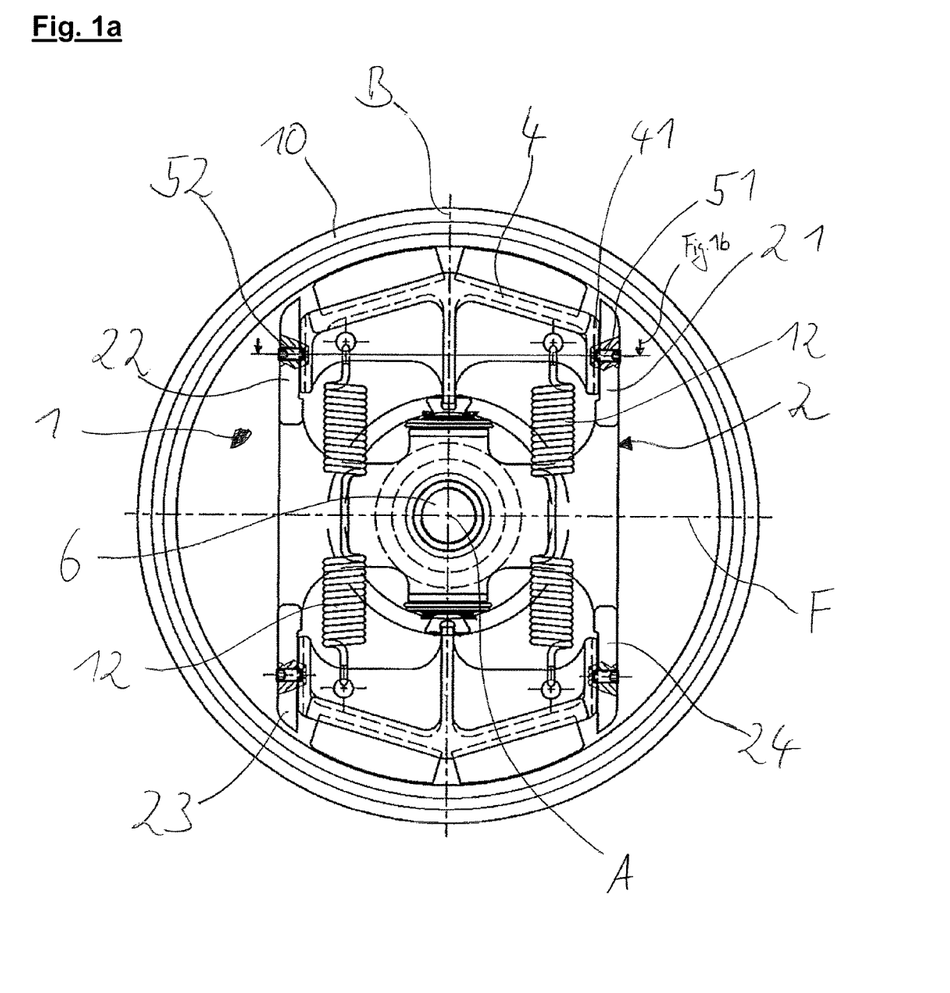
FIG. 1a is a first view of a first preferred embodiment of the brake unit according to the invention.

In the view shown in FIG. 1A of a preferred embodiment of the brake unit 1 according to the invention, this brake unit is arranged inside a brake drum 10. The brake unit 1 has a carrier unit 2 and preferably two jaw units 4. The carrier unit 2 has at least a first guiding member 21 and a second guiding member 22, wherein they are spaced apart from each other and are preferably constructed integrally with the additional regions of the carrier unit. The jaw unit 4 is arranged between the guiding members 21, 22 and secured against displacement longitudinally or parallel with a guiding direction F. That is to say, the jaw unit 4 is supported either on the first guiding member 21 or on the second guiding member 22 and is thereby secured against displacement in the guiding direction F by the guiding members 21, 22. Furthermore, the jaw unit 4 has at the side facing a guiding member 21, 22 in each case a groove 41 in which a securing element 51, 52 engages and secures the jaw unit 4 against displacement longitudinally or parallel with an axial line A. The axial line A is in this instance preferably the viewing direction of the embodiment shown and in a particularly preferred manner the rotation axis of the brake drum 10 about the brake unit 1. The securing element 51, 52 is preferably constructed as a threaded pin and screwed into a corresponding recess in the guiding member 21, 22. In this preferred embodiment, the carrier unit 2 is preferably constructed in a mirror-symmetrical manner with respect to a plane defined by the axial line A and the guiding direction F. That is to say, the carrier unit 2 has in the lower region thereof two guiding members 23, 24 which are constructed in a substantially identical manner to the guiding members 21, 22 which are arranged in the upper region and on which a securing element 51, 52 is also provided and a jaw unit 4 is secured against displacement in the guiding direction F and the axial line A. The carrier unit 2 is preferably constructed centrally between the four guiding members 21, 22, 23, 24 as a housing of an actuation unit 6, wherein the actuation unit 6 acts on the jaw units 4 which are supported in each case on the carrier unit 2 with a force in order to press them against the inner side of the brake drum 10. In this instance, the jaw units 4 are preferably pretensioned by two restoring elements 12 against the actuation unit 6. The jaw units 4 shown in this preferred embodiment can consequently preferably be displaced only in one actuation direction B relative to the carrier unit 2.

Figure 1B:
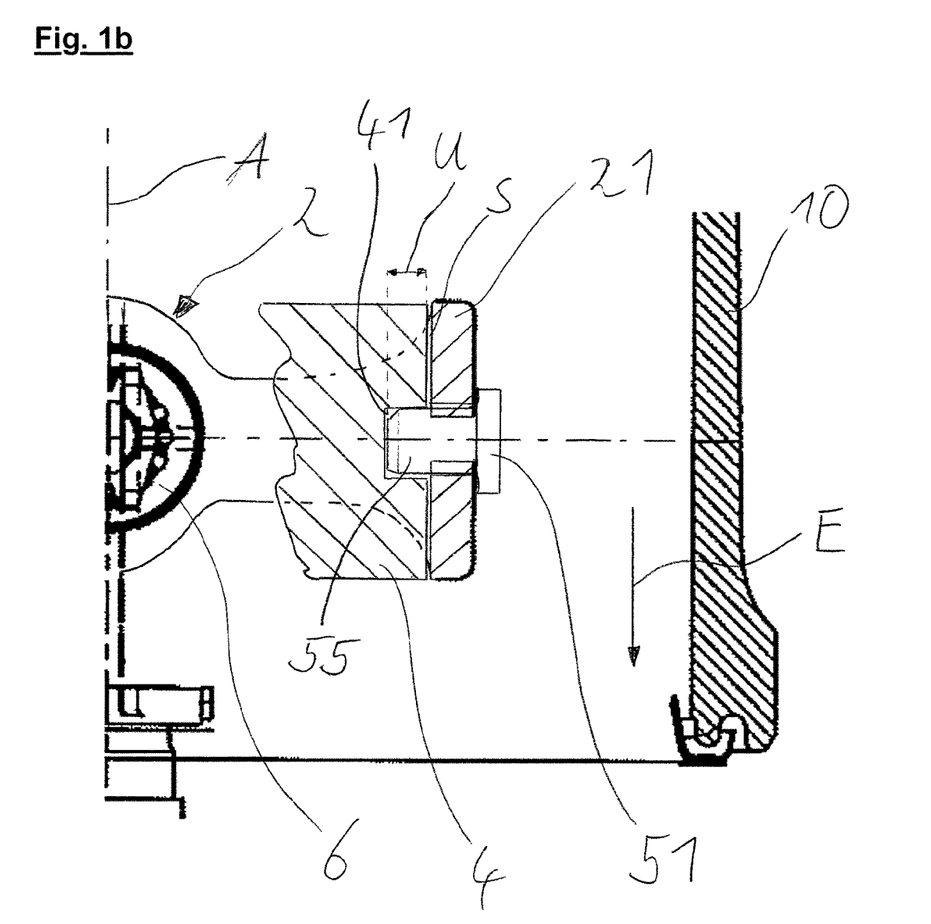

FIG. 1b shows the sectioned view identified in FIG. 1a of the preferred embodiment of the brake unit 1 as shown in FIG. 1a. In this instance, in particular the engagement region between the securing element 51 and the corresponding guiding member 21 is disclosed. It can further be seen that the securing element 51 in each case has a securing portion 55 which is brought into positive-locking engagement with the groove 41 of the jaw unit 4. Furthermore, there is shown the overlapping length U which is preferably a multiple of the play S between the jaw unit 4 and the guiding member 21.

Figure 2:
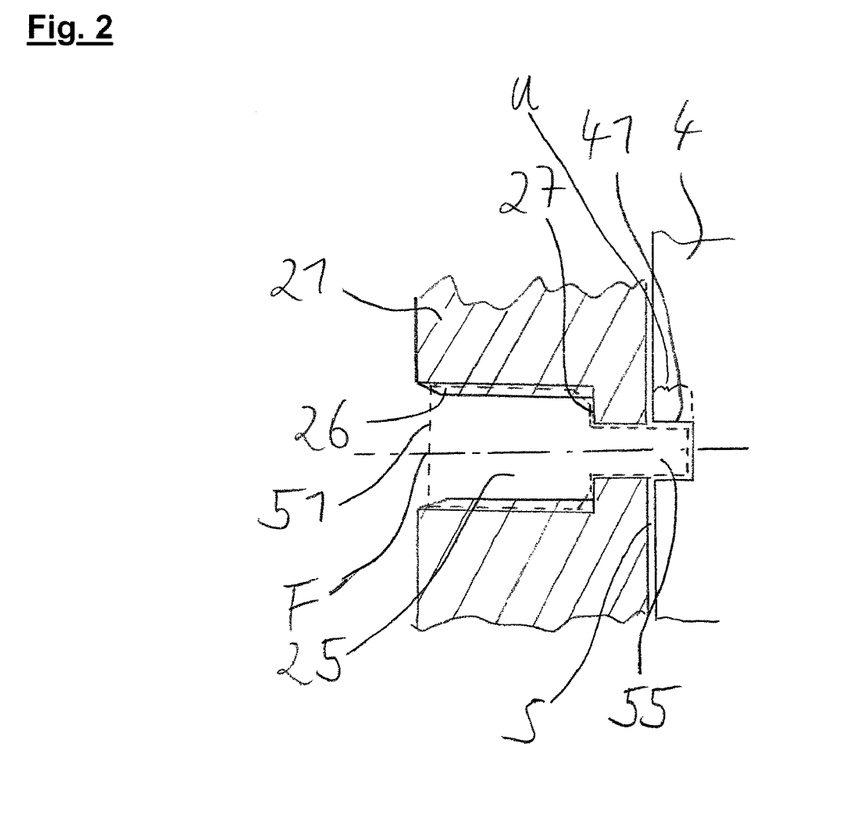
FIG. 2 is a partially sectioned view of another preferred embodiment of the brake unit according to the invention.

FIG. 2 is a sectioned view of another preferred embodiment of the brake unit 1 according to the invention, wherein the recess 25 is provided in the guiding member 21 with an engagement element 26 which is constructed as an inner thread. It can further be seen that there is provided at the side of the recess 25 facing the jaw unit 4 a stop 27, against which a securing element 51 which is illustrated with broken lines can be moved into abutment and as a result of the screwing with respect to the engagement means 26 can be tensioned against the stop so that undesirable unscrewing during operation of the brake unit 1 can be prevented. Furthermore, the securing element 51 has a securing portion 55 which protrudes through the reduced recess at the right-hand side of the stop 27 and which can be brought into positive-locking engagement with the groove 41 in the jaw unit 4 with an overlapping length U. It is further illustrated that there is provided between the jaw unit 4 and the guiding member 21 a gap which has a width of a play S. In the context of the present invention, it is particularly preferable for the play S to be significantly smaller than the overlapping length U.

Figure 3:
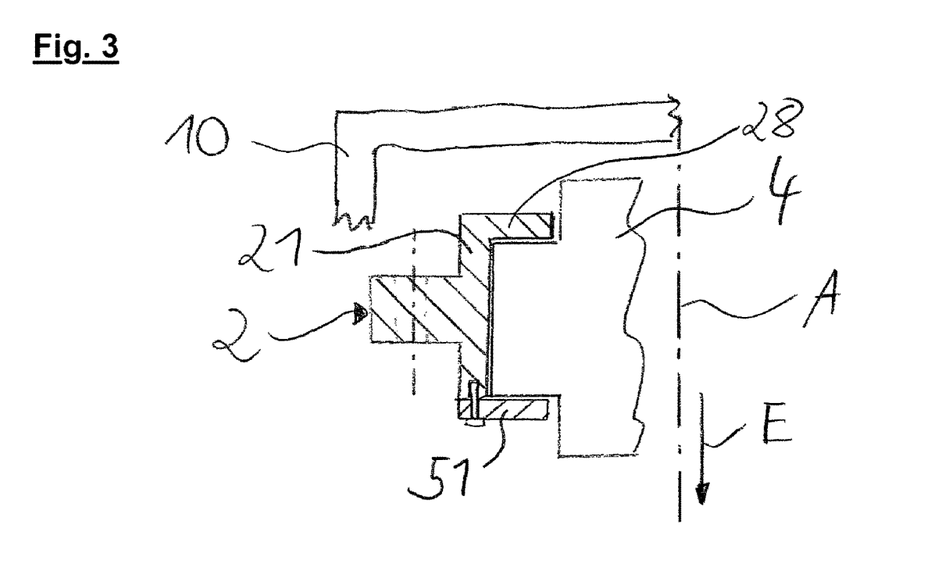
FIG. 3 is a partially sectioned view of another preferred embodiment.

FIG. 3 is a sectioned view of another preferred embodiment of the brake unit 1 according to the invention, wherein the securing element 51 is not constructed as a screw but is instead a sheet-like element which is screwed along the axial line A preferably by means of a screw element against a side of the guiding member 21. In this instance, the securing element 51 secures the jaw unit 4 only against displacement relative to the carrier unit 2 in a removal direction E. In this case, the removal direction E preferably extends parallel with the axial line A. At the end thereof opposite the securing element 51, the guiding member 21 preferably has a retention portion 28 which secures the jaw unit 4 against displacement counter to the removal direction E relative to the carrier unit 2.

Figure 4:
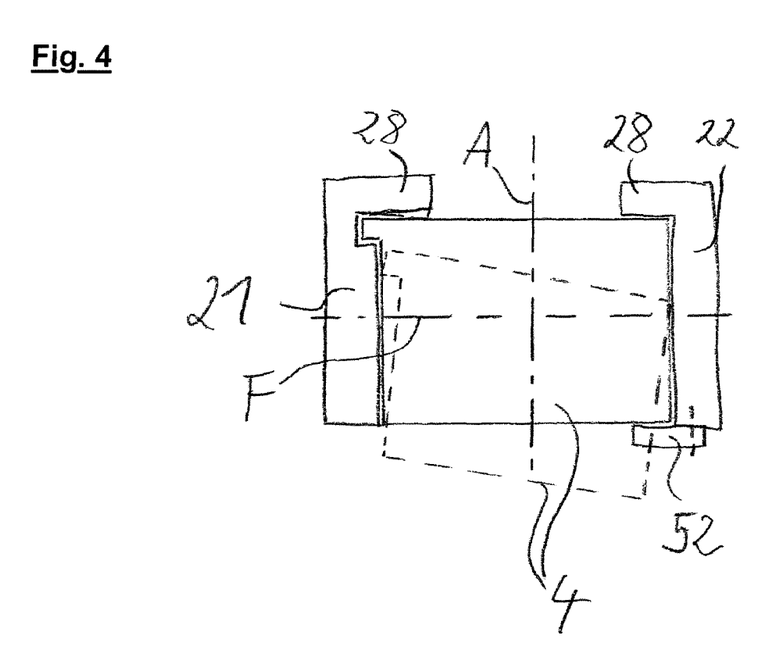
FIG. 4 is a view of another preferred embodiment of the brake unit according to the invention.

FIG. 4 shows another preferred embodiment of the brake unit according to the invention in which only one securing element 52 is required in order to secure the jaw unit 4 against displacement along the axial line A. In this instance, the jaw unit 4, as illustrated with broken lines, is introduced in a slightly oblique position into the intermediate space between the first guiding member 21 and the second guiding member 22 and engages at the side thereof shown at the top left in a groove in the first guiding member 21. Furthermore, the guiding members 21, 22 each have a retention portion 28 which prevents a displacement of the jaw unit 4 along the axial line A in at least one direction. After the jaw unit 4 has been inserted into the carrier unit 2, the securing element 52 is screwed to the second guiding member and in this manner secures the jaw unit 4 in the installation position thereof, in particular with respect to the guiding direction F and the axial line A.

LIST OF REFERENCE NUMERALS

2—Carrier unit
21—First guiding member
22—Second guiding member
23—Third guiding member
24—Fourth guiding member
25—Recess
26—Engagement means
28—Retention member
4—Jaw unit
51—First securing element
52—Second securing element
55—Securing portion
10—Brake drum
12—Restoring element
A—Axial line
B—Actuation direction
F—Guiding direction
E—Removal direction
S—Maximum play
U—Overlapping length

The invention claimed is:

1. A brake unit for use in a drum brake, comprising:
a carrier unit configured to be secured to a fixed portion of a utility vehicle chassis and having a first guiding member and a second guiding member, wherein the first guiding member and the second guiding member are spaced apart from each other; and
a jaw unit secured by the guiding members against displacement in a guiding direction, wherein the jaw unit is secured by a securing element configured to be secured to one of the guiding members against displacement along an axial line;
wherein the jaw unit is configured to be displaced in an actuation direction relative to the carrier unit;
wherein the guiding members are two cast or forged portions of the carrier unit which extend inside the brake drum; and
wherein the securing element is configured to be introduced parallel with the guiding direction into a recess of the guiding member and configured to be brought into at least one of non-positive-locking and positive-locking engagement with an engagement geometry, and
wherein the securing element has a securing portion configured to be brought into engagement with a groove of the jaw unit such that an undercut which acts parallel with the axial line is formed between the securing element and the groove.

2. The brake unit as claimed in claim 1, wherein at least one of a first securing element is releasably secured to the first guiding member and a second securing element is releasably secured to the second guiding member.

3. The brake unit as claimed in claim 1, wherein the recess has a stop to which the securing element is configured to be secured in the non-positive-locking manner and is secured against rotation about a parallel line with respect to the guiding direction.

4. The brake unit as claimed in claim 1, wherein the securing element comprises a threaded pin configured to be screwed into the recess of the guiding member and which has a cylindrical securing portion.

5. The brake unit as claimed in claim 1, wherein the securing element forms an undercut which secures the jaw unit only in a removal direction along the axial line against displacement relative to the carrier unit, and wherein the guiding member includes retention member which extends substantially in the guiding direction and which forms with the jaw unit an undercut which acts counter to the removal direction.

6. The brake unit as claimed in claim 5, wherein the guiding member forms with the retention member and the securing element a substantially U-shaped geometry.

7. The brake unit as claimed in claim 1, wherein the carrier unit at least partially forms a housing of an actuation unit.

8. The brake unit as claimed in claim 1, wherein the securing element engages with an overlapping length on the jaw unit, wherein in an assembled state of the brake unit the jaw unit is spaced apart from the guiding member with a maximum play, and wherein the ratio between the maximum play and the overlapping length is from 0.01 to 0.6.

9. The brake unit as claimed in claim 8, wherein the ratio between the maximum play and the overlapping length is from 0.05 to 0.4.

10. The brake unit as claimed in claim 9, wherein the ratio between the maximum play and the overlapping length is from 0.05 to 0.2.

11. The brake unit as claimed in claim 1, wherein the jaw unit is one of a plurality of jaw units, wherein the carrier unit has four guiding members, two of which in each case secure one of the plurality of jaw units against displacement parallel with the guiding direction, wherein a first pair of guiding members of the four guiding members is formed in a plane-symmetrical manner with respect to a second pair of guiding members of the four guiding members with respect to a plane defined by the guiding direction and the axial line.

12. The brake unit as claimed in claim 1, wherein the jaw unit is pretensioned by a restoring element against an actuation unit.

13. The brake unit as claimed in claim 1, wherein a plurality of securing elements are provided on the guiding member and secure the jaw unit against displacement along the axial line.

* * * * *